United States Patent [19]
Yoon

[11] Patent Number: 4,807,061
[45] Date of Patent: Feb. 21, 1989

[54] RAPID REEL BRAKING DEVICE FOR A VIDEO CASSETTE TAPE RECORDER

[75] Inventor: Jong Y. Yoon, Kyunggi, Rep. of Korea

[73] Assignee: Goldstar Co., Ltd., Seoul, Rep. of Korea

[21] Appl. No.: 140,163

[22] Filed: Dec. 31, 1987

[30] Foreign Application Priority Data

Dec. 31, 1986 [KR] Rep. of Korea ............... 22328/1986

[51] Int. Cl.⁴ .............................................. G11B 15/48
[52] U.S. Cl. .................................... 360/74.1; 360/137; 242/204
[58] Field of Search ................... 360/69, 73, 74.1, 90, 360/92, 96.3, 137, 85, 95; 242/204, 156.2

[56] References Cited
U.S. PATENT DOCUMENTS

4,452,409  6/1984  Takai ............................ 360/74.1 X
4,652,948  3/1987  Umeba .................................. 360/85
4,730,792  3/1988  Jong ..................................... 242/204
4,747,564  5/1988  Tsubota ......................... 360/96.3 X Primary Examiner—Stuart N. Hecker
Assistant Examiner—David J. Severin
Attorney, Agent, or Firm—Birch, Stewart, Kolasch & Birch

[57] ABSTRACT

A rapid reel braking device for a video cassette tape recorder comprising a function plate adapted to operate brakes for applying a braking force to reels of the recorder, a cam gear with several operative positions corresponding to various operation modes of the recorder, respectively, a connecting lever operatively connecting the function plate and the cam gear, and a lever mechanism including a hook lever and a hit lever and functioning to determine a desired operative position corresponding to the operation mode of the recorder.

2 Claims, 9 Drawing Sheets

RAPID REEL BRAKING DEVICE FOR A VIDEO CASSETTE TAPE RECORDER

BACKGROUND OF THE INVENTION

1. Field of the Invention

The present invention relates to a rapid reel braking device deck mechanism of the video cassette tape recorder and adapted to rapidly stop the rotation of supply and take-up reels engaged with a reel of a tape cassette, when it is desired. More particularly, the present invention relates to a rapid reel braking device for a video cassette tape recorder, which can rapidly and accurately stop the rotation of supply and take-up reels when the operation of the recorder is changed from a FF/REW (Fast Forward/Rewind) mode to a stop mode.

2. Description of the Prior Art

Generally, a video cassette tape recorder operates in a various modes, such as FF, REW, PLAY, REV, and PAUSE modes. When the operation mode of the video cassette tape recorder is changed, many parts of the deck mechanism must be moved to desired positions thereof, respectively, in order to carry out their functions in the changed operation mode.

Conventionally, mechanisms of various arrangements have been proposed, in order to move parts of the deck mechanism depending upon the change of the operation mode thereof. For example, a button-type mechanism has been proposed, which includes several buttons having a shape of, for example, a piano keyboard and utilizes the displacement of each button caused by pushing the button. Recently, many deck mechanisms obtain such displacement by utilizing a cam having a cam groove of a predetermined shape.

Such cam is provided, at the peripheral surface thereof, with a gear, in order to receive a power from the outside. The cam also has at upper and lower surfaces thereof spiral cam grooves into which a pin protruded from a function plate is inserted. As the cam rotates, the function plate is operated by the engagement between the groove and the pin. Thus, various operation modes of the video cassette tape recorder can be carried out.

In the case when a desired operation mode, particularly, FF mode or REW mode, of the recorder is carried out by the operation of the function plate resulted from the rotation of the cam, the supply and take-up reels are rotated at a high rate. As a result, when the operation mode of the recorder is changed from such modes to the STOP mode, the supply and take-up reels are still rotated more or less, due to the rotational inertia thereof. Thereby, it is difficult to stop, at a desired position, the tape which is taken out of the cassette and wound on the rotating drum. Furthermore, since the tape is continuously taken out of the cassette, by the length corresponding to the rotation amount of the reel resulted from the rotational inertia thereof, the tape may get tangled and even damaged. Accordingly, it is necessary to provide a rapid reel braking device which can apply a sudden brake force to the supply and take-up reels, in order to eliminate the above mentioned problems.

Figure 1:
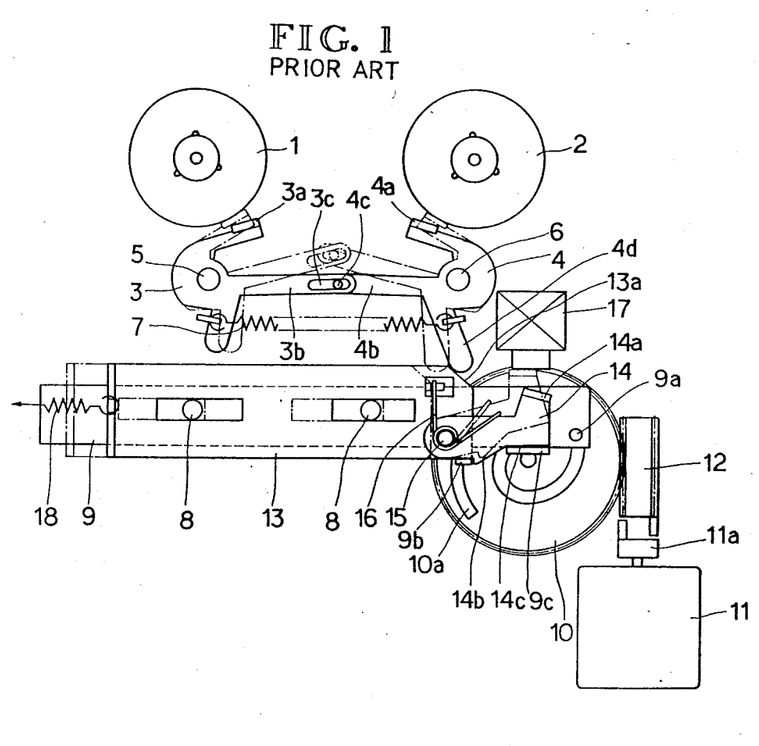
FIG. 1 is a plan view of a conventional rapid reel braking device for a video cassette tape recorder.

Referring to FIG. 1, a rapid reel brake device which has been applied to conventional deck mechanism is shown.

In the drawing, reference numerals 1 and 2 designate a supply reel and a take-up reel of a deck nechanism, respectively, which are also referred to as a reel table or a reel stand. Reels of a tape cassette are fitted around the upper portions of the supply and take-up reels, respectively. Adjacent base plate of the supply and take-up reels, a pair of brakes 3 and 4 are pivotably mounted by means of pins 5 and 6, respectively. Each brake 3 (or 4) has a brake shoe 3a (or 4a) attached on one end of the brake adjacent the reel 1 (or 2). Brakes 3 and 4 are connected with each other, at the other ends thereof positioned away from the reels, by means of a spring 7. By the spring 7, each brake shoe 3a (or 4a) is biased against the peripheral surface of the reel 1 (or 2).

Each brake 3 (or 4) has at the middle portion thereof an elongated portion 3b (or 4b) extending toward the other brake 4 (or 3). The extension 3b of the brake 3 is provided at the free end thereof with a slot 3c. The extension 4b of the brake 4 is also provided at the free end thereof with a connecting pin 4c which is inserted into the slot 3c of the brake 3, in order to operatively connect brakes 3 and 4. Adjacent the other ends of the brakes, a function plate 9 is disposed. The function plate 9 has a pair of slots into each of which a guide pin 8 protruded from a base plate of the deck is inserted. The function plate 9 is guided to move laterally by the guide pins 8. The function plate 9 also has at one end thereof a function pin 9a protruded from the lower surface of the function plate 9.

Adjacent to the end of the function plate 9 provided with the function pin 9a, a cam gear 10 is disposed. The cam gear 10 has at the upper surface thereof a spiral cam groove 10a in which the function pin 9a of the function plate 9 is inserted. The cam gear 10 is engaged with a worm 12 connected to pulley 11a of a drive motor 11. By this arrangement, as the drive motor rotates, the rotational power is transmitted to the cam gear 10, via the pulley 11a and the worm 12. As the cam gear 10 rotates, therefore, the function plate 9 is moved laterally in one direction or the opposite direction, depending upon the change of the radius of the cam groove 10a at the position of the function pin 9a.

On the function plate 9, a slide plate 13 is disposed. The slide plate 13 also has a pair of slots to receive the guide pins 8 so that it can slide on the function plate 9. In addition, the slide plate 13 has at one end thereof an inclined surface 13a against which the protrusion 4d of the brake 4 can contact. To this end, the protrusion 4d of the brake 4 is more or less longer than that of the brake 3. To the other end of the slide plate 13, a spring 18 is mounted, which functions to bias the slide plate 13 away from the cam gear 10.

Adjacent the end of the slide plate 13 provided with the inclined surface 13a, an operating lever 14 is pivotably mounted by means of a pin 15., The lever 14 has at one end thereof a contact member 14a formed by bending upwardly the end of the lever 14 The lever 14 is subject to a clockwise pivoting force by the torsion spring 16 fitted around the pin 15.

The lever 14 is also provided, at the edge of the middle portion thereof, with a shoulder 14b which can engage with a protrusion 9b of the function plate 9 so that the slide movement of the slide plate 13 caused by the force of the spring 18 can be limited. In order to limit the clockwise pivoting of the operating lever 14, the function plate 9 has a protrusion 9c and the lever 14 has a protrusion 14c engageable with said protrusion 9c of the function plate 9.

Adjacent the brake 4 for the take-up reel, a solenoid 17 is fixedly mounted on the base plate of the deck. When an electric power is applied to the solenoid 17 via a certain circuit (not shown), the contact member 14a of the operating lever 14 is contacted to the solenoid 17, thereby causing the protrusion 14b of the lever 14 to be disengaged from the protrusion 9b of the function plate 9.

At the stop mode of such arrangement of the conventional rapid reel braking device, brakes 3 and 4 closely contact to reels 1 and 2, respectively, as shown by the dotted line in FIG. 1. The slide plate 13 also has been moved by a certain distance toward the left of FIG. 1 so that the protrusion 4d of the brake 4 for the take-up reel is separated from the inclined surface 13a of the slide plate 13. Under such condition, brakes 3 and 4 pivot toward reels, and 2, respectively, by the spring force of the spring 7, so that brake shoes 3a and 4a apply a braking pressure to peripheral edges of reels 1 and 2, respectively. As the cam gear 10 is rotated by a certain angle from the stop mode, by driving the motor 11, the position of the function pin 9a of the function plate 9 in the cam groove 10a of the cam gear 10 is varied such that the radius of the cam groove of the function pin 9a is gradually increased. 10a at the position As a result, the function plate 9 is moved toward the right of FIG. 1, so that the slide plate 13 is moved together with the function plate 9 toward the right direction. The reason why the slide plate 13 can be moved together with the functon plate 9 is because the protrusion 14b of the operating lever 14 which is always subjected to the clockwise pivoting force by the torsion spring 16 is engaged with the protrusion 9b of the function plate 9, as above mentioned.

By such right movement of the slide plate 13, the inclined surface 13a of the slide plate 13 pushes the protrusion 4d of the brake 4 for the take-up reel 2, so as to pivot the brake 4 in the counterclockwise direction. Simultaneously, the brake 3 for the supply reel 1 is also pivoted in the clockwise direction, since the brake 3 is connected to the pin 4c of the brake 4. Thus, both brakes 3 and 4 are moved away from the supply and take-up reels 1 and 2, respectively, as shown in the solid line of FIG. 1. Accordingly, FF/REW or the play operation modes can be carried out.

When the operation mode is again converted from such modes into the stop mode, the function plate 9 is moved toward the left by the reversed rotation of the cam gear 10. Thereby, the slide plate 13 is also moved toward the left, so that the inclined surface 13a of the slide plate 13 disengaged from the protrusion 4d of the brake 4 for the take-up reel 2. As a result, brakes 3 and 4 pivot about pins 5 and 6 toward the supply and take-up reels and apply the braking forces thereon, respectively.

If a conversion command into the stop mode is input during the operation of FF/REW mode, the cam gear 10 reversely rotates and the function plate 9 moves toward the left, as in the above case. Simultaneously, a voltage is applied to the solenoid 17. Then, the supply of the voltage is instantly stopped. Accordingly, the contact member 14a of the operating lever 14 is contacted to and then instantly separated from the solenoid 17. At this time, the protrusion 14b of the operating lever 14 is disengaged from the protrusion 9b of the function plate 9. Simultaneously, the slide plate 13 is urged toward the left by the spring 18, so that the inclined surface 13a disengaged from the protrusion 4a of the brake 4 for the take-up reel 2. Thus, both brake shoes 3a and 4a of the brakes 3 and 4 are rapidly contacted to the reels 1 and 2, respectively, so that both reels 1 and 2 are stopped at the same time.

After a sudden braking force is applied to both reels 1 and 2 by the left movement of the slide plate 13 due to the spring force of the spring 18, the cam gear 10 continuously rotates in the counterclockwise direction. As a result the position of the function pin 9a of the function plate 9 in the cam groove 10a of the cam gear 10 is varied such that the radius of the cam groove 10a at the position of the function pin 9a is gradually reduced. Thereby, the function plate 9 is moved toward the left by a certain distance, so that the protrusion 14b of the operating lever 14 is again engaged with the protrusion 9b of the function plate 9. At this state, when the operation of PLAY mode or FF/REW mode is required, 10 the function plate 9 is moved toward the right by the clockwise of the can gear 10. This, brakes 3 and 4 are moved away from the reels 1 and 2.

Such type of the conventional rapid reel braking device has a complicated overall construction, because in addition to the function plate 9, the slide plate 13 and the operating lever 14 are used. As a result, it is impossible for the device to be compact. Due to the use of expensive solenoid 17, it is necessary to provide a separate circuit for connecting and disconnecting the solenoid to and from an electric power source. As a result, there are problems of the increase of the consumption of the electric power, the increase of the manufacture cost.

SUMMARY OF TUE INVENTION

Therefore, an object of the present invention is to provide a rapid reel braking device of a simple construction which can sufficiently carry out the rapid brake action, in order to eliminate the above-mentioned disadvantages encountered in the prior art.

In accordance with the present invention, this object is accomplished by providing a rapid reel braking device for a video cassette tape recorder which includes a supply reel and a take-up reel rotatably mounted on a base plate thereof and spaced from each other, and a drive motor fixedly mounted on said base plate, said device comprising: a pair of brakes pivotably mounted on the base plate of said recorder and adapted to apply a brake force to said supply and take-up reels, respectively, each brake having at one end thereof a brake shoe a spring connected between the other ends of said brakes to urge said brakes toward said supply and take-up reels; a function plate having a pair of slots each receiving a guide pin fixed on said base plate of the recorder, so as to laterally slide on said base plate, said function plate also provided at one side of one end thereof with an inclined surface adapted to engage with and push said other end of the take-up reel, so as to pivot said brakes away from said supply and take-up reels against the force of said spring; a function pin fixed on the other side of said one end of the function plate; a cam gear rotatably mounted on said base plate of the recorder, said cam gear having at the lower surface thereof a cam groove; a connecting lever pivotably mounted, at the middle portion thereof, on said base plate of the recorder under said cam gear and adapted to operatively connect said function plate and said cam gear, said connecting lever having at one end thereof a slot receiving said function pin and at the other end thereof a connecting pin engaged in said cam groove of the cam gear, a hook-shaped extension being formed on said other end of the connecting lever; a hook lever pivotably mounted, at the middle portion thereof, on said base plate of the recorder under said cam gear, said hook lever having at one end thereof a hook-shaped extension engageable with said hook-shaped extension of the connecting lever and at the other end thereof a stop member; a torsion spring adapted to urge said hook lever to pivot in the direction that said hook-shaped extension of the hook lever is engaged with said hook-shaped extension of the connecting lever; a hit lever having a slot receiving a pin fixed on said base plate of the recorder, so as to laterally slide and pivot about said pin, said hit lever having at one end thereof a protrusion engageable with said stop member of the hook lever and at the other end thereof an extension engageable with a shoulder formed on said pulley of the drive motor, which pulley can not rotate when said shoulder is engaged with said extension of the hit lever; a spring adapted to urge said hit lever to pivot in the direction that said extension of the hit lever is engaged with said shoulder of the pulley; and a worm connected to said pulley of the drive motor and engaged with said cam gear to transmit the drive power of the drive motor.

In accordance with the present invention, the cam groove of the cam gear includes several operative positions which correspond to operation modes of the recorder.

In accordance with the present invention, the rapid reel braking device also includes a locker having at the free and thereof a locking member adapted to lock the hook-shaped extension of the hook lever during the rapid braking operation.

BRIEF DESCRIPTION OF THE DRAWINGS

The above object and feature of the present invention will be apparent from the following description taken in conjunction with the drawings, wherein:

FIGS. 2 and 3 are plan views of a rapid reel braking device for a video cassette tape recorder in accordance with the present invention, wherein FIG. 2 shows the condition when the recorder is at the stop mode, in which each brake is closely contacted with each reel, FIG. 3 shows the condition when the recorder is operated at one of modes other than the stop mode, in which each brake is separated from each reel;

FIGS. 5 to 12 are views for explaining operation conditions of a cam gear at different operation modes of the recorder, respectively, wherein

DETAILED DESCRIPTION OF THE PREFERRED EMBODIMENTS

Figure 2:
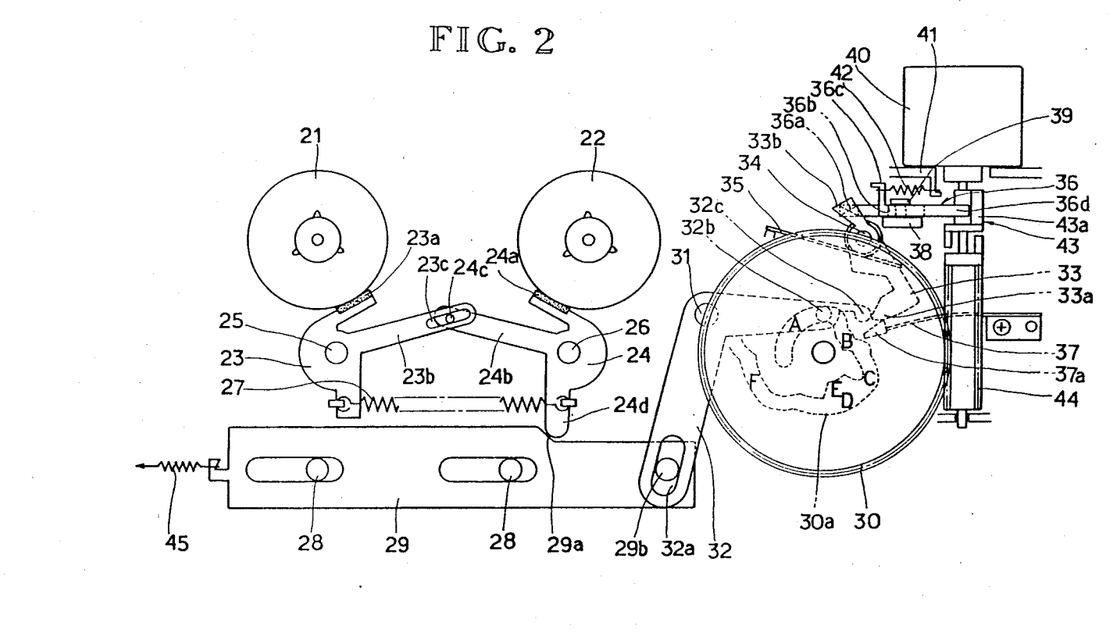
Figure 3:
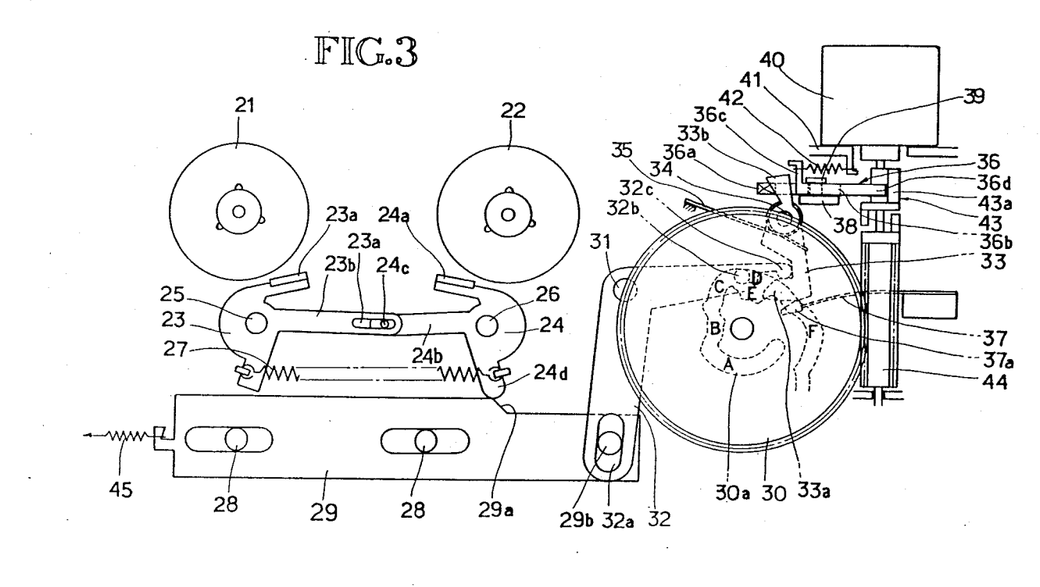
Figure 4:
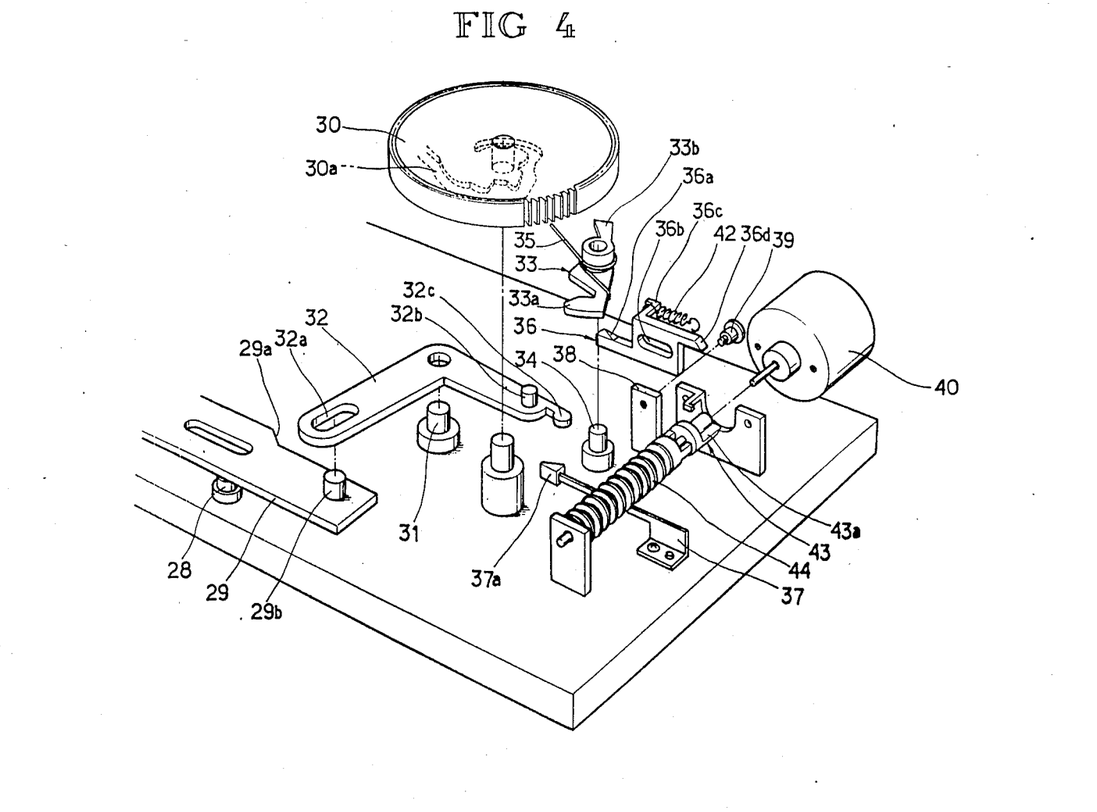
FIG. 4 is an exploded perspective view of the rapid reel braking device of the present invention.
Figure 5:
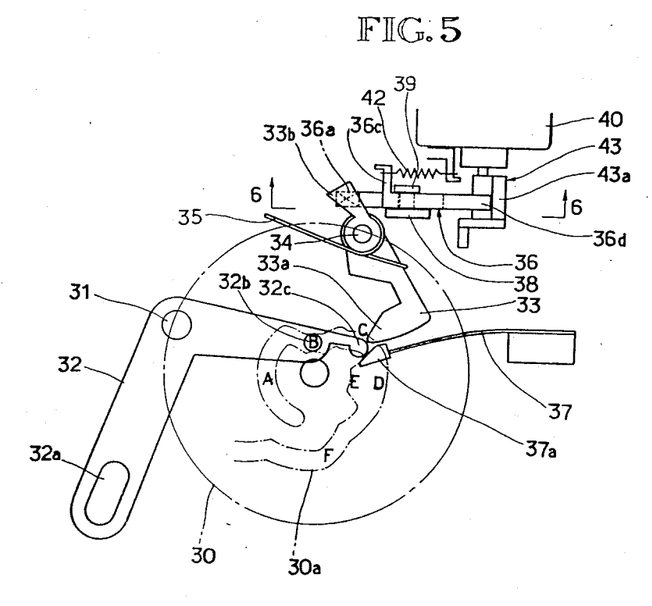
FIG. 5 is a plan view showing the condition that the locking of a hook lever is released.

Referring to FIGS. 2 to 4, there is shown a rapid reel braking device for a video cassette tape recorder in accordance with the present invention. The device comprises two brakes 23 and 24 provided for a supply reel 21 and a take-up reel 22, respectively, and a function plate 29 for operating said brakes. The constructions of these elements are similar to those of the above-mentioned prior art. According to the present invention, however, the function plate 29 has an inclined surface 29a which has the same function as the inclined surface 13a of the slide plate 13 in the prior art. That is, the inclined surface 29a of the function plate 29 functions to push a protrusion 24d of the brake 24 for the take-up reel 22. The function plate 29 has at one end (that is, the right end in FIG. 2) a function pin 29b protruded from the upper surface of the function plate 29.

The device of the present invention also comprises a cam gear 30 having at the lower surface thereof a cam groove 30a of a particular shape according to the present invention. Under the cam gear 30, a connecting lever 32 is disposed, which operatively connects the function plate 29 and the cam gear 30. The connecting lever 32 is pivotably mounted, at the middle portion thereof, on a base plate 50 (FIG. 4) of the recorder, by means of a pin 31. The connecting lever 32 is provided at one end thereof with a slot 32a in which the function pin 29b of the function plate 29 is received. The connecting lever 32 is also provided at the other end thereof with a connecting pin 32b which is engaged in the cam groove 30a of the cam gear 30. A hook-shaped extension 32c is formed on the other end of the connecting lever 32.

As shown in FIG. 2, the cam groove 30a formed on the lower surface of the cam gear 30 has several operative positions (in the illustrated embodiment, A to F) so that the connecting lever 32 can be pivoted by a desired angle, depending on the change of the operation mode of the recorder, in order to laterally displace the function plate 29.

Under the cam gear 30, a hook lever 33 is disposed adjacent the end of the connecting lever 32 provided with the hook-shaped extension 32c. The hook lever 33 is pivotably mounted, at the middle portion thereof, on the base plate 50 of the recorder, by means of a pin 34. The hook lever 33 is urged to pivot about the pin 34 in the clockwise direction, by means of a torsion spring 35. The hook lever 33 has at one end thereof a hook-shaped extension 33a engageable with the hook-shaped extension 32c. The hook lever 33 has also at the other end thereof a triangular stop member 33b which is adapted to restrict a clockwise pivoting of a hit lever 36, as will be described hereinafter. Between the pin 34 and the hook-shaped extension 33a, the hook lever 33 is provided with a recess for receiving the hook-shaped extension 32c of the connecting lever 32.

Adjacent the hook-shaped extension 33a of the hook lever 33 and under the cam gear 30, a locker 37 is fixedly mounted on the base plate 50 of the recorder. The locker 37 has at the free end thereof a locking member 37a. The locking member 377 can be engaged with the hook-shaped extension 33a of the hook lever 33, in order to lock the hook lever 33 at the position in which the hook-shaped extension 33a is disengaged from the hook-shaped extension 32c of the connecting lever 32 In accordance with the illustrated embodiment of the present invention, the locker 37 is made of a leaf spring, so that the locking member 37a of the locker 37 is urged against the hook-shaped extension 33a of the hook lever 33.

As shown in FIG. 4, the hit lever 36 is provided at the plate-shaped middle portion thereof with a slot 36b. In the slot 36b of the hit lever 36, a pin 39 protruded from a fixing member 38 is engaged. The fixing member 38 is fixed on the base plate 50 of the recorder. By this engagement between the slot 36b and the pin 39, the hit lever 36 is pivotable about the pin 39 and laterally displaceable slightly that is, by the length of the slot 36b. The hit lever 36 is provided at the upper portion thereof with a protrusion 36c to which one end of a tension spring 42 is connected. The other end of the spring 42 is connected to a fixing plate 41 of a drive motor 40. By the spring 42, the hit lever 36 is always urged to pivot in the clockwise direction. The hit lever 36 has at one end thereof an upward protrusion 36a engageable with the stop member 33b of the hook lever 33. The hit lever 36 is also provided at the other end thereof with an extension 36d which is engageable with a shoulder 43a formed on the pulley 43 of the drive motor 40. As above-mentioned, the hit lever 36 is urged to pivot in the clockwise direction by the spring 42. However, this pivoting of the hit lever 36 is restricted by the stop member 33b of the hook lever 33 which is selectively engageable with the protrusion 36a of the hit lever 36. Accordingly, the extension 36d of the hit lever 36 can engage with the shoulder 43a of the pulley 43, only when the protrusion 36a of the hit lever 36 is disengaged from the stop member 33b of the hook lever 33. A worm 44 is connected to the pulley 43 of the drive motor 40 by means of a coupling. The worm 44 is also engaged with the cam gear so that the drive power of the drive motor 40 can be transmitted to the cam gear 30.

In the drawings, a reference numeral 45 designates a tension spring connected to the function plate 29. By the spring 45, the function plate 29 is urged toward the left.

Figure 13:
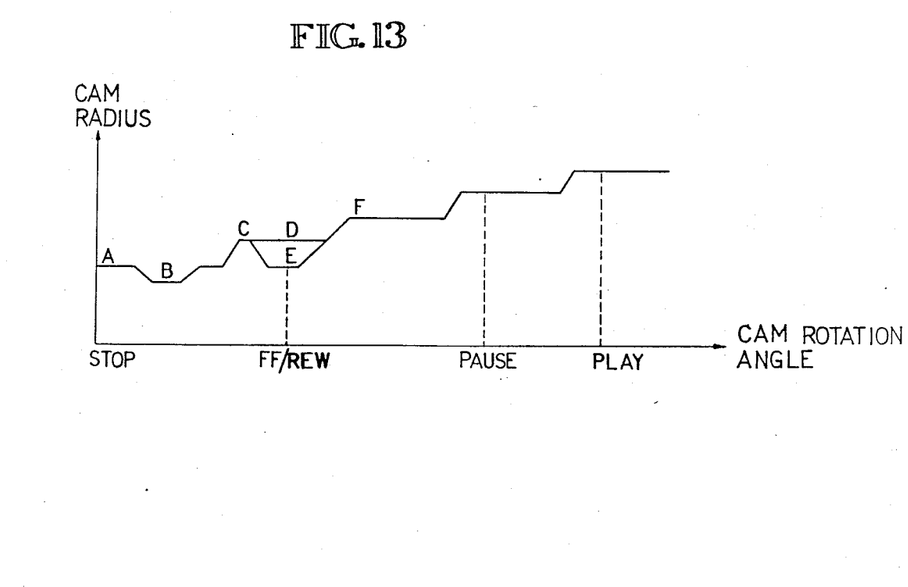
FIG. 13 is a diagram of the radius variation of the cam gear of the present invention.

Now, the operation of the rapid reel braking device according to the present invention will be described, in conjunction with FIG. 13 which is a diagram of the radius variation of the cam. Points A to F of FIG. 13 correspond to operative positions A to F of the cam groove 30a formed on the cam gear 30, respectively.

When the recorder is changed to the stop mode, the connecting lever is positioned at the operative position A of the cam groove 30a of the cam gear 30. The operative position B of the cam gear 30 corresponds to the condition when the recorder is ready for a next operation mode after the operation mode has been changed into the stop mode. The operative position C corresponds to the condition when FF/REW mode is initiated. The operative position D corresponds to the condition when the operation of the recorder at FF/REW mode proceeds. The operative position E corresponds to the condition when the operation mode of the recorder is changed from FF/REW mode to the stop mode. At the operative position E, the braking operation is carried out. Finally, the operative position F corresponds to the condition when PLAY mode is initiated.

FIG. 2 shows the operation condition of the rapid reel braking device at the stop mode of the recorder. At this condition, the function plate 29 has been displaced toward the left so that the inclined surface 29a of the function plate 29 is disengaged from the end 24d of the brake 24 for the take-up reel 22, thereby causing the brake shoe of each brake to be urged against the corresponding reel, by the force of the spring 27, and thus apply the braking force thereto.

Figure 6:
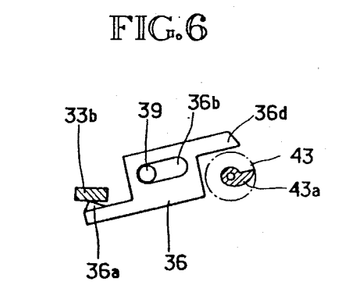
FIG. 6 is a cross-sectional view taken along the line 6—6 of FIG. 5.

At this time, the connecting pin 32b of the connecting lever 32 is positioned between positions A and B of the cam groove 30a of the cam gear 30. Accordingly, the hook-shaped extension 32c of the connecting lever 32 is engaged with the hook-shaped extension 33a of the hook lever 33. The stop member 33b of the hook lever 33 is also engaged with the protrusion 36a of the hit lever 36, so as to lift the extension 36d of the hit lever 36 above the extent of the rotation radius of the shoulder 43a of the pulley 43, as shown in FIG. 6. Therefore, the extension 36d of the hit lever 36 does not contact with the shoulder 43a formed on the pulley 43 of the drive motor 40 so that the pulley 43 can rotate continuously, thereby causing the cam gear 30 to rotate.

As the cam gear 30 rotates, the function pin 32b of the connecting lever 32 reach the position B of the cam groove 30a. At this time, the stop member 33b of the hook lever 33 is still engaged with the protrusion 36a of the hit lever 36. Accordingly, the pulley 43 and cam gear 30 rotate continuously.

Figure 8:
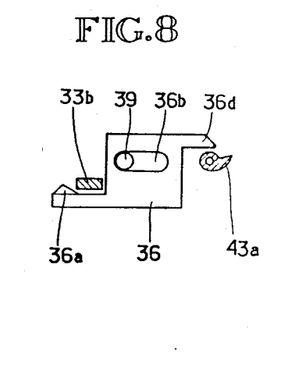
FIG. 8 is a cross-sectional view taken along the line 8—8 of FIG. 7.

As the cam gear 30 rotates, the function pin 32b of the connecting lever 32 reach the position C of the cam groove 30a. At this time the connecting lever 32 pivots counterclockwise by an angle corresponding to the increment of the cam radius, so that the hook-shaped extension 32c of the connecting lever 32 is disengaged from the hook-shaped extension 33a of the hook lever 33. Accordingly, the hook lever 33 pivots in clockwise, in virtue of the force of the torsion spring 35. As a result, the stop member 33b of the hook lever 33 is disengaged from the protrusion 36a of the hit lever 36, thereby permitting the hit lever 36 to pivot clockwise by the force of the spring 42, as shown in FIG. 8. At this time, the extension 36d is positioned within the extent of the rotation radius of the pulley shoulder 43a, so that the clockwise rotation of the pulley 43 is not allowed. Such condition corresponds to the condition when the recorder which has been at the stop mode initiates the operation of FF/REW mode.

Figure 7:
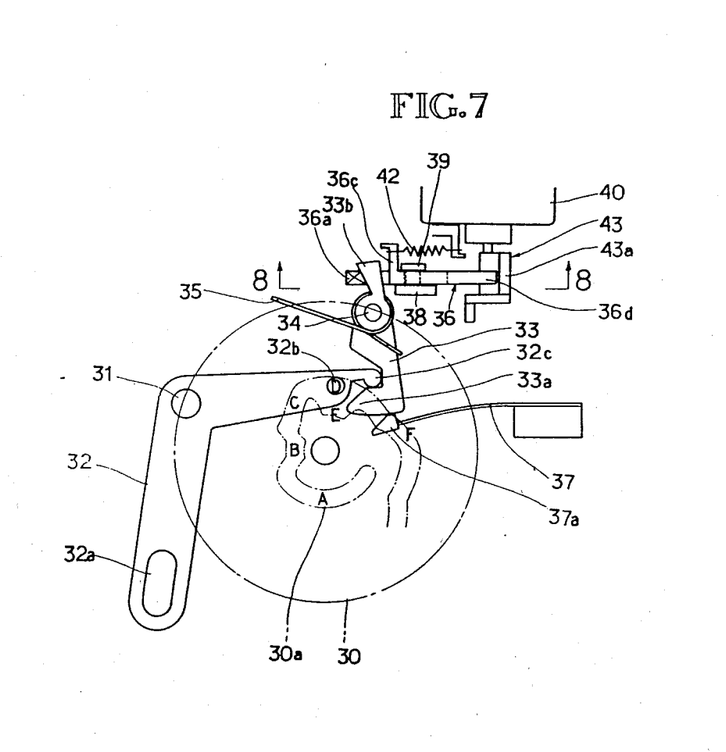
FIG. 7 is a plan view showing the condition at FF/REW operation mode.

As the cam gear 30 further rotates from the above-mentioned condition, the connecting pin 32b of the connecting lever 32 reach the position D of the cam groove 30a, as shown in FIG. 7. At this time, the hook-shaped extension 32b of the connecting lever 32 is engaged in the recess which is formed on the hook lever 33 inside of the hook-shaped extension 33a. This condition corresponds to FF/REW mode of the recorder. Under this condition, the function plate 29 is displaced toward the right, according to the counterclockwise pivoting of the connecting lever 32. Accordingly, the inclined surface 29a of the function plate 29 pushes the end 24d of the brake 24, so that both brakes 23 and 24 pivot about the pins 25 and 26, and thus disengage from the reels 21 and 22, respectively. The stop member 33b of the hook lever 33 is still disengaged from the protrusion 36a of the hit lever 36. Thus, the extension 36d is still positioned within the extent of the rotation radius of the pulley shoulder 43a, so that the clockwise rotation of the pulley 43 can be prevented.

Figures 9, 10:
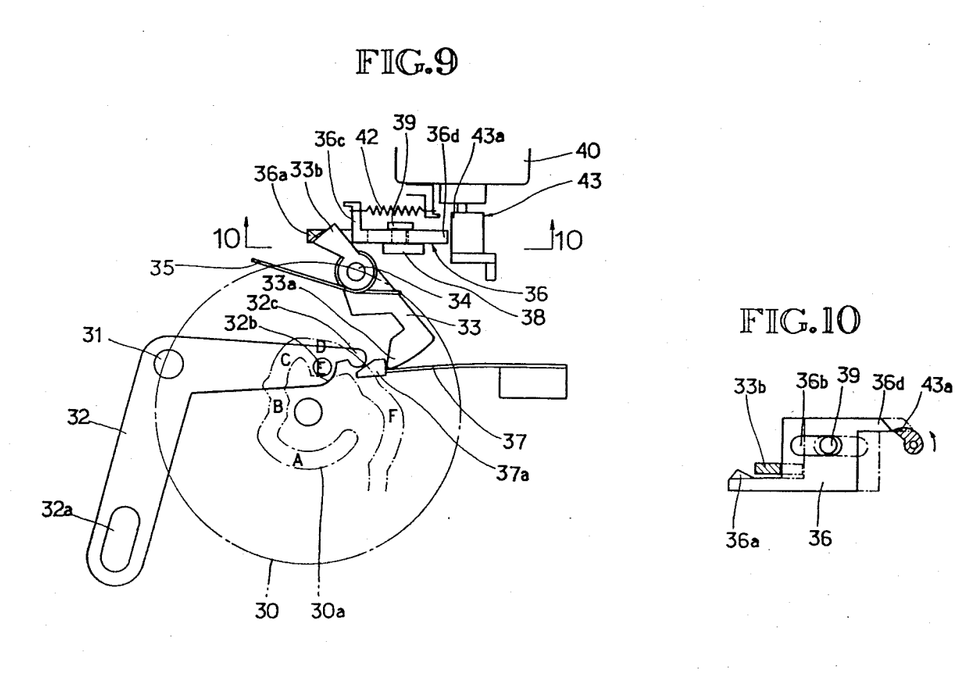
FIG. 9 is a plan view showing the condition when the rapid braking is carried out.
FIG. 10 is a cross-sectional view taken along the line 10—10 of FIG. 9.
Figure 11:
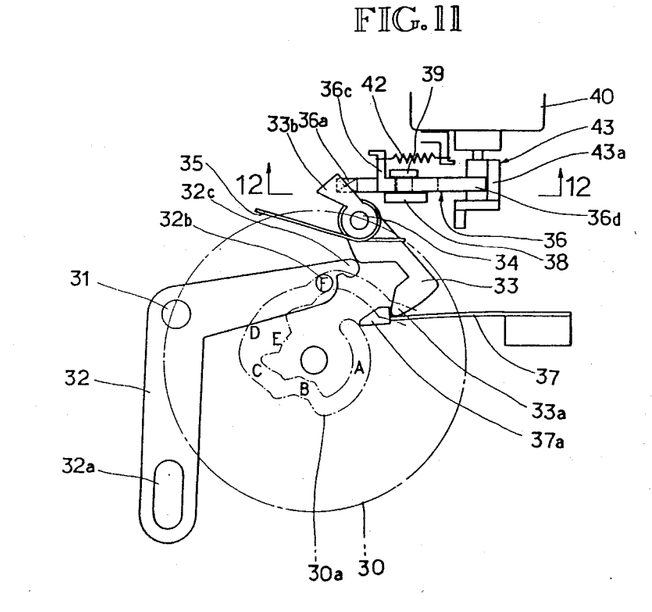
FIG. 11 is a plan view showing the condition of PAUSE mode and FIG. 12 is a cross-sectional view taken along the line 12—12 of FIG. 11.
Figure 12:
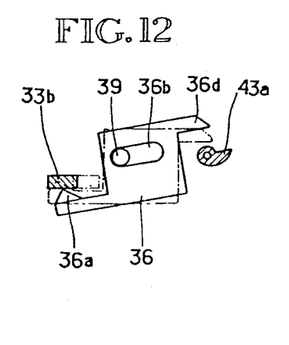

When the operation mode of the recorder is changed from FF/REW mode to the stop mode, the braking operation is carried out, according to the present invention. That is, the pulley 43 firstly rotates counterclockwise, by the drive power of the drive motor 40. As the pulley 43 rotates, the shoulder 43a of the pulley 43 pushes the extension 36d of the hit lever 36 from the position indicated by the atom line of FIG. 10 to the position indicated by the solid line of FIG. 10. As a result, the stop member 33b of the hook lever 33 is urged to displace toward the left together with the hit lever 36, so that the hook lever 33 pivots counterclockwise about the pin 34, thereby causing the hook-shaped extension 33a thereof to be engaged with the locking member 37a of the locker 37. Simultaneously, the connecting pin 32b of the connecting lever 32 is instantly displaced from the position D of the cam groove 30a to the position E thereof. Since the cam radius at the position E is shorter than that at the position D, the connecting lever 32 instantly pivots clockwise, thereby causing the function plate 29 to instantly move toward the left. As a result, the inclined surface 29a of the function plate 29 is disengaged from the end 24d of each other by the force of the spring 27. Thus, a sudden braking force is applied to both reels 21 and 22.

If it desires to release the braking force of both brakes 23 and 24 for the change of the operation mode of the recorder, under the condition that the hook-shaped extension 33a of the hook lever 33 is engaged with the locking member 37a of the locker 37, the drive motor 40 has to rotate so that the connecting pin 32b of the connecting lever 32 is positioned at the position B of the cam groove 30a. When the connecting pin 32b of the connecting lever 32 reach the position B of the cam groove 30a, the hook-shaped extension 32c of the connecting lever 32 push the locking member 37a of the locker 37, in virtue of the clockwise pivoting of the connecting lever 32 which results from the decrease of the cam radius at the position B. As a result, the hook-shaped extension 33a of the hook lever is disengaged from the locking member 37a of the locker 37. Thus, the rapid reel braking device is ready for the next operation mode of the recorder. As apparent from the above description, the position B of the cam groove 30a is the operation position for proceeding the function of releasing the engagement between the hook-shaped extension 33a of the hook lever 33 and the locking member 37a of the locker 37, which engagement is provided for applying the braking force.

Now, when the operation mode of the recorder is changed from FF/REW mode to PLAY mode, the operation of the rapid reel braking device will be described.

As the pulley 43 further rotates, the connecting pin 32b of the connecting lever 32 reach the operative position F of the cam groove 30a. At this time, the cam radius of the cam gear 30 is gradually increased until the connecting pin 32b of the connecting lever 32 reach the position F of the cam groove 30a, thereby causing the connecting lever 32 to pivot counterclockwise. When the connecting pin 32b of the connecting lever 32 reach the position F of the cam groove 30a, the hook-shaped extension 32c of the connecting lever 32 which is engaged in the recess of the hook lever 33 is urged against the hook lever 33, thereby causing the hook lever 33 to pivot counterclockwise. When the hook lever 33 pivots counterclockwise by a certain angle, the hook-shaped extension 33a of the hook lever 33 is engaged with the locking member 37a of the locker 37 which has been urged against the hook-shaped extension 33a of the hook lever 33, by its return spring force. At this time, the stop member 33b of the hook lever 33 is engaged with the protrusion 36a of the hit lever 36, so that the extension 36d of the hit lever 36 is lifted over the extent of the rotation radius of the pulley shoulder 43a. Therefore, the extension 36d of the hit lever 36 contacts with the pulley 43 which rotates. Thereby, the cam gear 30 rotates so that the braking device can be operated, according to PLAY mode of the recorder.

The order and arrangement operative positions of the cam groove of the cam gear may be optionally changed. It can be understood that only in the illustrated embodiment of the present invention, the arrangement is made such that it corresponds the operation mode changes from the stop mode to FF/REW mode and from FF/REW mode to PLAY mode.

As apparent from the above description, the rapid reel braking device for a video cassette tape recorder according to the present invention can reliably and accurately carry out the rapid reel braking function, by a simple construction, as compared with the prior art. Therefore, it enables the overall device to be compact and light. In addition, it is possible to reduce the manufacture cost, in virtue of not using a separate solenoid.

What is claimed is:

1. A rapid reel braking device for a video cassette tape recorder which includes a supply reel and a take-up reel rotatably mounted on a base plate thereof and spaced from each other, and a drive motor fixedly mounted on said base plate, said drive motor having a pulley, said device comprising:

a pair of brakes pivotably mounted on the base plate of said recorder and adapted to apply a braking force to said supply and take-up reels, respectively, each brake having at one end thereof a brake shoe;

a spring connected between the other ends of said brakes to urge said brakes toward said supply and take-up reels;

a function plate having a pair of slots each receiving a guide pin fixed on said base plate of the recorder, so as to laterally slide on said base plate, said function plate also provided at one side of one end thereof with an inclined surface adapted to engage with and push said other end of the brake for the take-up reel, so as to pivot said brakes away from said supply and take-up reels against the force of said spring;

a function pin fixed on the other side of said one end of the function plate;

a cam gear rotatably mounted on said base plate of the recorder, said cam gear having at the lower surface thereof a cam groove;

a connecting lever pivotably mounted, at the middle portion thereof, on said base plate of the recorder under said cam gear and adapted to operatively connect said function plate and said cam gear, said connecting lever having at one end thereof a slot receiving said function pin and at the other end thereof a connecting pin engaged in said cam groove of the cam gear, a hook-shaped extension being formed on said other end of the connecting lever;

a hook lever pivotably mounted, at the middle portion thereof, on said base plate of the recorder under said cam gear, said hook lever having at one end thereof a hook-shaped extension engageable with said hook-shaped extension of the connecting lever and at the other end thereof a stop member;

a locker fixedly mounted on said base plate of the recorder and provided at the free end thereof with a locking member engageable with said hook-shaped extension of the hook lever, so as to lock the hook lever during the rapid braking operation of the braking device;

a torsion spring adapted to urge said hook lever to pivot in the direction that said hook-shaped extension of the hook lever is engaged with said hook-shaped extension of the connecting lever;

a hit lever having a slot receiving a pin fixed on said base plate of the recorder, so as to laterally slide and pivot about said pin, said hit lever having at one end thereof a protrusion engageable with said stop member of the hook lever and at the other end thereof an extension engageable with a shoulder formed on said pulley of the drive motor, which pulley can not rotate in one direction when said shoulder is engaged with said extension of the hit lever;

a spring adapted to urge said hit lever to pivot in the direction that said extension of the hit lever is engaged with said shoulder of the pulley; and a worm connected to said pulley of the drive motor and engaged with said cam gear to transmit the drive power of the drive motor.

2. A device in accordance with claim 1, wherein said cam groove formed on said cam gear has several operative positions (A to F) which are an operative position A corresponding to a stop mode of said recorder, an operative position B corresponding to the condition when the recorder is ready for a next operation mode after the operation mode has been changed into the stop mode, an operative position C corresponding to the condition when FF/REW mode of the recorder is initiated, an operative position D corresponding to the condition when FF/REW mode of the recorder proceeds, an operative position E corresponding to the condition when the operation mode of the recorder is changed from FF/REW mode to the stop mode, a braking operation being carried out at said operative position E, and an operative position F corresponding to the condition when PLAY mode is initiated.

* * * * *